US011091729B2

United States Patent
Roozen et al.

(10) Patent No.: US 11,091,729 B2
(45) Date of Patent: *Aug. 17, 2021

(54) NEUTRALIZED VINEGAR CONCENTRATES AND LIQUID FOOD GRADE BLENDS CONTAINING SAID NEUTRALIZED VINEGAR CONCENTRATES

(71) Applicant: PURAC BIOCHEM B.V., Gorinchem (NL)

(72) Inventors: Lambertus Henricus Elisabeth Roozen, Gorinchem (NL); Gerrit Anthon Rene Hilhorst, Gorinchem (NL); Anja Neubauer, Gorinchem (NL)

(73) Assignee: PURAC BIOCHEM B.V., Gorinchem (NL)

( * ) Notice: Subject to any disclaimer, the term of this patent is extended or adjusted under 35 U.S.C. 154(b) by 231 days.

This patent is subject to a terminal disclaimer.

(21) Appl. No.: 16/057,581

(22) Filed: Aug. 7, 2018

(65) Prior Publication Data

US 2018/0346857 A1 Dec. 6, 2018

Related U.S. Application Data

(63) Continuation of application No. 15/128,840, filed as application No. PCT/NL2015/050187 on Mar. 23, 2015.

(60) Provisional application No. 61/969,332, filed on Mar. 24, 2014.

(30) Foreign Application Priority Data

Mar. 24, 2014 (EP) .................................... 14161285

(51) Int. Cl.
| | |
|---|---|
| *C12J 1/00* | (2006.01) |
| *A23L 3/3508* | (2006.01) |
| *A23L 3/3463* | (2006.01) |
| *A23L 3/3571* | (2006.01) |
| *A23L 3/3472* | (2006.01) |

(52) U.S. Cl.
CPC ............... *C12J 1/00* (2013.01); *A23L 3/3463* (2013.01); *A23L 3/3472* (2013.01); *A23L 3/3508* (2013.01); *A23L 3/3571* (2013.01); *Y02A 40/90* (2018.01)

(58) Field of Classification Search
CPC .... A23L 3/3472; A23L 3/3571; A23L 3/3508; A23L 3/3463; C12J 1/00
USPC .................................................. 426/266, 264
See application file for complete search history.

(56) References Cited

U.S. PATENT DOCUMENTS

| | | |
|---|---|---|
| 3,002,896 A | 10/1961 | Buck |
| 4,076,844 A | 2/1978 | Ebner et al. |
| 4,313,960 A | 2/1982 | Campagne |
| 2010/0310738 A1 | 12/2010 | Ludwig |
| 2012/0201950 A1 | 8/2012 | Toledo |

FOREIGN PATENT DOCUMENTS

| | | |
|---|---|---|
| EP | 2000035 A1 | 12/2008 |
| EP | 2227965 A1 | 9/2010 |
| GB | 1101560 A | 1/1968 |
| GB | 1535336 A | 12/1978 |
| JP | 59-175870 A | 10/1984 |
| NL | 7609825 A | 3/1977 |
| WO | WO-2007/035244 A1 | 3/2007 |
| WO | WO-2014/021719 A1 | 2/2014 |

OTHER PUBLICATIONS

Marquina et al., "Preliminary study of wine vinegars, sherry and cider", Alimentaria, CSIC, Jan. 2003, 40(340):113-117, abstract.
International Search Report issued in PCT/NL2015/050187, dated Jun. 29, 2015, 4 pages.

*Primary Examiner* — Vera Stulii
(74) *Attorney, Agent, or Firm* — Foley & Lardner LLP

(57) ABSTRACT

The present invention is directed to a process for making a concentrated vinegar product by simple evaporation, which concentrated vinegar product can also be used as intermediate in the production of products that can be listed on food labels as "vinegar".

18 Claims, No Drawings

NEUTRALIZED VINEGAR CONCENTRATES AND LIQUID FOOD GRADE BLENDS CONTAINING SAID NEUTRALIZED VINEGAR CONCENTRATES

CROSS-REFERENCE TO RELATED APPLICATIONS

This application is a continuation of U.S. patent application Ser. No. 15/128,840 filed Sep. 23, 2016, which is the National Phase of International Patent Application No. PCT/NL2015/050187 filed Mar. 23, 2015, published on Oct. 1, 2015 as WO 2015/147638 A1, which claims priority to both European Patent Application No. 14161285.3 filed Mar. 24, 2014 and U.S. Provisional Patent Application No. 61/969,332 filed Mar. 24, 2015. The contents of these applications are herein incorporated by reference in their entirety.

FIELD OF THE INVENTION

The present invention concerns the field of liquid, concentrated food preservation products, in particular concentrated vinegar products. The present invention provides a method of producing highly concentrated vinegar, enabling the production of food-grade liquid preservation products comprising high amounts of vinegar. Such liquid preservation products and their uses are also encompassed by the invention.

BACKGROUND OF THE INVENTION

Vinegar is a term used to denote a sour liquid with acetic acid as the main component that has been widely used in domestic cooking for ages as a condiment, a preservative, a flavorings ingredient, etc. The preparation of vinegar is one of the oldest food production methods of mankind and involves the oxidative fermentation of ethanol, primarily obtained from plant material, by acetic acid bacteria (*Acetobacter Aceae*). It is a time-consuming production process, comparable in certain aspects to wine making. The composition of vinegar can be quite complex and varies depending on the starting material, some examples including vinegar from alcohol (e.g. white vinegar, brandy vinegar, alcoholic vinegar, balsamic vinegar), wine vinegar (made from wine, excess wine or waste wine), vinegar made from floury substances (e.g. malt vinegar, beer vinegar, cane vinegar, potato vinegar, rice vinegar) and fruit vinegar (made from fruit juice, e.g. apple vinegar, cherry vinegar, banana vinegar). Major vinegar components, besides acetic acid, include other organic acids (mainly gluconic, malic, tartaric, succinic acids) and sugars (mainly glucose and fructose). Classes of minor components include volatile compounds and antioxidant molecules, mainly polyphenols. Such minor components are important to the flavor and aroma of the vinegar.

According to food regulations in Europe and the United States the term "vinegar" can be used only to denote liquid products obtained by the acetous fermentation of an alcoholic liquid and containing a minimum percentage of acetic acid, usually at least 4 or 4.5%.

When vinegar is used as an ingredient in industrial food processing it can be listed on the label simply as "vinegar", rather than the chemical name, acetic acid. This is a big advantage for Industrial food processors, as consumer aversion against chemically descriptive words on the list of declared ingredients on food labels is growing considerably. Thus, food processors are trying to remove ingredients that may not be considered "label friendly" and substituting ingredients that can be considered natural. Ideally, processors would like to have an "all natural" declaration on the label. Because vinegar has been used in domestic cooking for ages, it has the generally regarded as safe (GRAS) status and 'consumer acceptance' is still high.

At the same time, industrial food processors are seeking to obtain more concentrated forms of vinegar. One obvious advantage of using more concentrated products is that it reduces the volume of the product to be applied to accomplish a certain (anti-microbial) effect. More concentrated forms are also advantageous with regard to transportation and storage. Furthermore, concentrated vinegars can be blended with other food grade compositions to produce new liquid food preservation products.

It has proven technologically challenging though, to develop methods for processing vinegar into concentrated products meeting all the demands imposed by food processors in terms of quality, stability and regulatory requirements. Many dilute substances may be concentrated by simple evaporation, but with vinegar this is not feasible because of the relatively close boiling points of water and acetic acid (even though the two do not form an azeotrope) and of the relatively low flash point of acetic acid (i.e. the temperature at which it can vaporize to form an ignitable mixture in air). Fractional distillation processes have been described in the art, for example in U.S. Pat. No. 3,002,896, but these processes are unattractive from an economical point of view. As a matter of fact, to date no commercial concentrated vinegars are produced by evaporation or distillation techniques.

The technique nowadays most often applied in the production of concentrated vinegar is "freeze concentration". This technique involves freezing at least a portion of the aqueous part and separating the ice from the remaining liquid. U.S. Pat. No. 4,076,844 refers to a process in which vinegar of lower acidity is subjected to freezing. The ice so formed contains very little acid and is removed by centrifugation, leaving the desired higher acidity vinegar, having an acetic acid concentration of 20 percent weight by volume or more. Freeze concentration is also mentioned in U.S. Pat. No. 4,313,960, which describes a process for the preparation of vinegar by freeze concentration, stating that the essential condition to obtain an acceptable product is to add ethyl alcohol to the vinegar. Preferably, the vinegar/ethanol mixture is made to pass over ion exchange resins to improve the flavour of the vinegar. Freeze concentration has its limits in terms of maximum concentration that can be attained, due to the increased viscosity at freezing temperatures. Separation of ice from viscous concentrated products becomes more and more difficult as the concentration increases until eventually no further concentration effect can be achieved. Apart from these limitations, the process is inherently expensive because it requires a large investment in machinery and entails high operating costs in the form of electrical energy and man power. The addition of components such as ethyl-alcohol is undesirable with a view to application of the product as a food ingredient.

GB-B-1,101,560 and U.S. Pat. No. 4,076,844, for example, mention freeze concentration as a known technique for producing concentrated vinegar, but underline how this technique is costly and unfavourable. In view of these limitations, the use of a particular acetic fermentation technique (so-called submersed fermentation) to obtain vinegar with a high degree of acidity is advocated. U.S. Pat. No. 4,076,844, describes a two-stage fermentation process according to which vinegar with an acetic acid concentration between 16 and 17 percent weight by volume was obtained. Clearly, this process is also quite cumbersome, whereas the highest possible acetic acid concentration in the vinegar is still not higher than 17%.

According to NL7609825, vinegar is concentrated by contacting it with a hydrate forming substance, such as trichlorofluoromethane or dichloromethane, at a temperature below the maximum temperature at which the hydrate is formed. Thereafter the hydrate formed is separated from the concentrated vinegar and any formed solid vinegar, for example by sublimation or dissolution of solid hydrate under such conditions, that solid acetic acid is not sublimed or dissolved and is not denaturated. In this way vinegar having a concentration up to 80% by weight of acetic acid can be obtained. However, this process has the disadvantage that the hydrate forming substances can only be removed with high costs from the concentrated natural vinegar, whereas the characteristic aromatic constituents are lost completely or substantially completely. The addition of components such as trichlorofluoromethane or dichloromethane is problematic, at least with a view to application of the product as a food ingredient.

More recently, in WO 2007/035244, a process for producing concentrated vinegar was described based on simple evaporation after complete neutralization of the vinegar with sodium bicarbonate. The neutralized vinegar is concentrated by evaporation until a thin layer of crystalline material is formed on the surface of the material. To this concentrate, a certain amount of vinegar is added back in an amount resulting in 10 to 20% excess of acetic acid salt over free acid. A problem encountered in the process according to WO 2007/035244 is that the sodium acetate tends to crystallize out of solution, so that the concentrated neutralized vinegar should not be allowed to cool down. For the same reason the vinegar mix, i.e. the product obtained after adding back vinegar, should not contain more than 45% of acetic acid/ acetate salt.

It is not surprising, given the above, that the most concentrated form of vinegar commercially available to date is 300 grain, which corresponds to a total acidity, based on acetic acid, of approximately 30%.

It is an object of the invention to prepare a concentrated natural vinegar product without the disadvantages of the known processes. It is an objective of the present invention to provide a concentrated natural vinegar product that has good microbiological and physical stability and can be labeled as vinegar in (industrial) food processing.

SUMMARY OF THE INVENTION

The present inventors found a way to obtain an excellent concentrated vinegar product by simple evaporation, which concentrated vinegar product can be used as intermediate in the production of products that can be listed on food labels as "vinegar", thereby realizing an objective of this invention.

An essential element of the present invention resides in the neutralization of the vinegar with an alkalizing agent comprising cationic potassium. The present inventors found that potassium neutralized vinegar behaves significantly more favorable than sodium neutralized vinegar under the conditions typically applied in the process of concentrating by evaporation.

Hence, the invention in particular pertains to a process of producing a neutralized vinegar concentrate, to the neutralized vinegar concentrate thus obtained, to blends of the neutralized vinegar concentrate with other food grade ingredients, in particular other food grade organic acids, to the application of the neutralized vinegar concentrate and the blends of this invention in the preservation of food products and to the food products thus obtained.

These and other aspects of the invention will be explained in more detail in the following description and illustrated in the appending examples.

DETAILED DESCRIPTION OF THE INVENTION

A first aspect of the invention concerns a Process of producing a neutralized vinegar concentrate, said process comprising the steps of:
a) providing a liquid vinegar;
b) adding an alkaline potassium compound to said liquid vinegar to produce a neutralized vinegar having a pH of at least 6; and
c) concentrating said neutralized vinegar to a dry solids level of above 50% (w/w) by evaporation.

In this document, the term vinegar is used to denote the liquid obtained by the acetous fermentation of an alcoholic liquid, containing at least 4 grams of acetic acid per 100 ml, in particular a vinegar that can be declared 'natural', e.g. in terms of the FDA guidelines. According to said guidelines "natural" means minimally processed and containing no synthetic ingredients or processing aids (cf. Food Labeling: Nutrient Content Claims General Principles, Petitions, Definitions of Terms, 56 Fed. Reg. at 60,466).

In a preferred embodiment step a) comprises providing a vinegar selected from the group consisting of white vinegar, brandy vinegar, alcoholic vinegar, balsamic vinegar, wine vinegar, malt vinegar, beer vinegar, potato vinegar, rice vinegar, apple vinegar, cherry vinegar, and cane vinegar. In a particularly preferred embodiment of the invention, the vinegar is cane vinegar.

In a preferred embodiment of the invention, the acetic acid content of the vinegar is at least 5% (w/w), more preferably at least 7.5% (w/w), even more preferably at least 10% (w/w). It is also possible to make use of vinegar that has been pre-concentrated to a certain extent. Such products are commercially available and typically have an acetic acid content between 20 and 30% (w/w). In a preferred embodiment of the invention, the acetic acid content of the vinegar is at least 20% (w/w), more preferably at least 25% (w/w), e.g. about 29 or 30% (w/w). A common measure for indicating the acetic acid content of vinegar is the grain strength. The grain strength is the acetic acid content expressed in g/l, so 50 grain vinegar is about 5% (w/w) acetic acid. As will be appreciated by those skilled in the art, it is preferred that the vinegar is at least 200 grain, more preferably at least 250 grain. Often, commercial food-grade vinegars are offered at 200 grain and 300 grain. In one preferred embodiment of the invention, a 300 grain vinegar is used.

Step b) of the process of this invention comprises adding an alkaline potassium compound. Alkalinity, as used herein, refers to the capability of the compound to lower the amount of protons in a solution to any extent and, hence, increasing the pH value. It does not necessarily imply an increase of the pH to above neutral. The term "alkaline potassium compound" means an organic or inorganic compound containing cationic potassium, which reacts with an acid to accept hydrogen atoms and/or donate a pair of valence electrons, and, as such, can be added to the vinegar to neutralize it to the desired extent. Examples of the alkaline potassium compounds in accordance with the invention include potassium hydroxide, potassium carbonate and potassium bicarbonate. In a preferred embodiment of the invention the alkaline potassium compound is potassium hydroxide.

In one embodiment of the invention, the process comprises addition of potassium hydroxide, especially the addition an aqueous solution containing at least 100 g/l of potassium hydroxide, more preferably at least 250 g/l of potassium hydroxide, more preferably at least 500 g/l of potassium hydroxide.

It is envisaged that other alkaline compounds may be used in conjunction with potassium hydroxide. For example, other alkali or earth alkali metal hydroxides, such as sodium and/or calcium hydroxide, may be added in addition to the alkaline potassium compound.

In case other alkaline compounds are added besides the alkaline potassium compound, it is preferred that at least 50% of the total mol amount of the cations added is potassium, more preferably at least 60%, at least 70%, at least 80%, at least 90%, or at least 95%.

In one particular embodiment of the invention, step b) comprises the addition of an alkaline potassium compound, preferably potassium hydroxide, and an alkaline sodium compound, preferably sodium hydroxide, in a (mol/mol) ratio of above 3/1, preferably within the range of 3/1-100/1.

In a preferred embodiment of the invention, step b) comprises adjusting the pH value of the vinegar to a value within the range of 6-10, more preferably to a value within the range of 7-9, most preferably to a value within the range of 7.5-8.5

In a preferred embodiment of the invention, step b) comprises adding alkaline compound to the vinegar in an amount sufficient to accomplish a degree of neutralization of at least 50%, more preferably at least 60%, more preferably at least 70%, more preferably at least 80%, more preferably at least 90%, more preferably at least 95% and most preferably at least 99%. The 'degree of neutralization', as used herein, is a parameter expressing the amount of carboxyl groups present in the salt form relative to the total number of carboxyl groups, which can be equated as follows: (—COOM groups)/(sum of —COOM groups and —COOH groups)(*100 percent), where the —COOM groups represent a salt formed between an acetate carboxyl group and a cation.

In an embodiment of the invention, the alkaline potassium compound and the vinegar are combined in such (relative) amounts that the (mol/mol) ratio of potassium cations to acetate anions in the solution is more than 0.5/1, preferably more than 0.6/1, more preferably more than 0.7/1, more preferably more than 0.8/1, more preferably more than 0.9/1, more preferably more than 0.95/1, most preferably more than 0.99/1.

In case other alkaline compounds are used besides the alkaline potassium compound, it is preferred that they are added in amounts providing cations in a total amount of potassium and other alkaline compounds in excess of 50% of the stoichiometric equivalent. The term "stoichiometric equivalent" as used herein to quantify the relative amount of cations in the composition, means the amount necessary to provide counterions for all acetate ions present in the vinegar. Hence, an amount of 50% of the stoichiometric equivalent refers to an amount providing counterions for 50% of the acetate anions. As will be understood by those skilled in the art, the stoichiometric equivalent for monovalent potassium cations equates to a 1:1 molar ratio of acetate and potassium ions, while the stoichiometric equivalent of acetate and divalent calcium cations would equate to a 2:1 molar ratio, which also means that a 2:1 mixture of calcium and potassium cations (on the basis of mol amounts) in a stoichiometric equivalent will comprise acetate, $Ca^{2+}$ and $K^+$ in a molar ratio of 5:2:1. In a preferred embodiment of the invention, alkalizing agent is added in an amount providing metal cations in a total amount in excess of 60% of the stoichiometric equivalent, preferably in excess of 70%, in excess of 80%, in excess of 90%, in excess of 95%, or in excess of 99% thereof.

In accordance with the present invention, the neutralized vinegar obtained in step b) is subjected to a process resulting in the removal of water, typically by evaporation. The invention is not particularly critical as to the type of evaporation process used. Typically, however, step c) of the present method will involve heating of the neutralized vinegar to above room temperature and/or the application of sub-atmospheric pressure.

In a preferred embodiment of the invention, step c) comprises heating of the neutralized vinegar to a temperature within the range of 20-120° C., more preferably to a temperature within the range of 40-110° C., most preferably to a temperature within the range of 60-100° C.

In a preferred embodiment of the invention, step c) comprises heating of the neutralized vinegar while keeping the neutralized vinegar under reduced pressure.

The person skilled in the art will be able to select the appropriate equipment and to perform such a process on the basis of common general knowledge and applying routine skills. As exemplary embodiments, the use of a rising or falling film evaporator, or a batch pan may be mentioned. In a preferred embodiment of the invention, step c) comprises concentrating the neutralized vinegar obtained in step b) in a falling film evaporator apparatus, operated at the above indicated temperatures and pressures.

Preferably, step c) comprises concentrating said neutralized vinegar to a dry solids level of above 50% (w/w), as indicated before, more preferably to a dry solids level within of above 55% (w/w), more preferably to a dry solids level of above 58% (w/w), most preferably above 60% (w/w). Preferably, step c) comprises concentrating the neutralized vinegar until a dry solids level within the range of 50-70% (w/w) is reached, more preferably until a dry solids level within the range of 60-65% (w/w) is reached.

Preferably, step c) comprises concentrating said neutralized vinegar to an acetate salt level of above 50% (w/w), e.g. at least 50.1% (w/w); at least 50.5% (w/w); at least 51% (w/w); or at least 52% (w/w). .More preferably, step c) comprises concentrating said neutralized vinegar to an acetate salt level of above 55% (w/w), more preferably above 58% w/v, most preferably above 60% (w/w). Preferably, step c) comprises concentrating said neutralized vinegar to an acetate salt level within the range of 50-70% (w/w), more preferably within the range of 60-65% (w/w).

The term 'acidity' is also often used to characterize the type of products of this invention. In this context, the term "total acidity" is used to denote the total amount of organic acids in salt form and in acid form per unit of volume of the product. "Total acidity" can e.g. be expressed in mmol of acid per 100 g of the product. Total acidity can also be expressed as a weight percentage, on the basis of the acid (molar) weight(s). For example, a completely KOH neutralized vinegar, concentrated to a 60% (w/w) potassium acetate concentration would have a total acidity of 611 mmol per 100 g, or, based on acetic acid, of approximately 36% (w/w). When different types of organic acids are present, total acidity is the sum of the total acidities per organic acid (for this the total acidities of per single acid have to be known/determined).

The term "free acidity" is used to denote the amount of organic acids in acid form per unit of volume of the product. Free acidity can e.g. be expressed in mmol of acid per 100 g of the product. "Free acidity" can also suitably be expressed as a (weight) percentage of free acid relative to the total weight of the composition.

Free acidity and total acidity can be assessed by means of potentiometric titration which is a routine method for those of average skill in the art.

Preferably, step c) comprises concentrating the neutralized vinegar until a total acidity of above 500 mmol/100 g is reached, more preferably until a total acidity of above 550 mmol/100 g is reached, more preferably until a total acidity of above 580 mmol/100 g is reached, most preferably until a total acidity of above 600 mmol/100 g is reached. Preferably, in step c) the neutralized vinegar is concentrated to a total acidity within the range of 500-700 mmol/100 g, more preferably to a total acidity within the range of 600-650 mmol/100 g is reached.

The concentrated neutralized vinegar produced in accordance with the above-described process typically is in the form of a liquid, as will be understood by those skilled in the art, e.g. based on the characteristics as described here above. More in particular, the concentrated neutralized vinegar produced in accordance with the above-described process typically is in the form of a solution.

It is one particular advantage of the present invention that the concentrated neutralized vinegar as produced in accordance with the above-described process is relatively stable and, in particular, can be kept at ambient temperatures, or even at temperatures below 10° C. or near 0° C., without acetate salt crystallizing out of the solution in any appreciable amount. Moreover, since the water activity of the concentrated neutralized vinegar is relatively low, the product is also microbiologically stable at ambient temperatures. Hence, an embodiment of the present invention is envisaged where the concentrated neutralized vinegar is allowed to cool down. Preferably the concentrated neutralized vinegar obtained in step c) is allowed to cool down to a temperature within the range of 0-35° C., more preferably to a temperature within the range of 0-30° C., most preferably to a temperature within the range of 0-25° C. In an embodiment of the invention, the process comprises placing and keeping the concentrated neutralized vinegar in a tank with cooling means, such as a double wall or a tubular or plate heat exchanger to cool it to a temperature as indicated above. In an embodiment of the invention, the product is allowed to cool down simply by storage under ambient conditions.

The product obtained as described in the foregoing can be used as such in e.g. food processing. Nevertheless, in a preferred embodiment of the invention, the concentrated neutralized vinegar is subjected to further processing steps in order to produce products that can be listed as "vinegar" or containing "vinegar".

An aspect of the invention concerns a process of producing a liquid food preservation product, comprising the process of producing a neutralized vinegar concentrate as defined in the foregoing, followed by the steps of:

d) providing a further composition comprising one or more organic acids and/or organic acid salts; and e) combining said concentrated neutralized vinegar and said further composition comprising one or more organic acids and/or organic acid salts to obtain a liquid food preservation product.

In the application of the liquid food preservation product, the product of the invention has the advantage that the dosage levels can be low due to the high concentration of vinegar. In one embodiment, said further composition comprising one or more organic acids and/or organic acid salts is selected so that dilution of the neutralized concentrated vinegar as a result of step e) is minimized. Hence, in an embodiment of the invention said further composition has a high dry solids content, e.g. above 10% (w/v), above 20% (w/v), above 30% (w/v), or above 40% (w/v).

In one embodiment of the invention, a process as defined herein before is provided, wherein step d) comprises providing a second liquid vinegar. Preferably said second liquid vinegar is a vinegar of 200-300 grain. Preferably said second liquid vinegar is a crude vinegar. In a particularly preferred embodiment of the invention the vinegars provided in steps a) and d) are the same type and (grain) strength. As will be understood by those skilled in the art, this embodiment results in a (concentrated) product comprising acetate in partially neutralized form.

In a particularly preferred embodiment of the invention, the second liquid vinegar is combined with the concentrated neutralized vinegar in an amount resulting in a free acidity of at least 3.5 g/100 ml, more preferably at least 4 g/100 ml, most preferably at least 4.2 g/100 ml. Products produced in accordance with this embodiment of the invention can be listed as "vinegar" and/or as "natural".

In one embodiment of the invention, a process as defined herein before is provided, wherein step d) comprises providing a composition comprising a lactate component and/or a propionate component and/or a citrate component. The terms lactate component, propionate component and citrate component as used herein encompass the respective acids as well as salt forms of the respective acids, as will be understood by those skilled in the art.

As will be understood by those skilled in the art, embodiments are envisaged wherein a lactate component and/or propionate component and/or a citrate component is added as a highly purified product. Such highly purified products are available commercially and it is, additionally, within the common general knowledge and capabilities of those of average skill in the art to produce such products.

In a preferred embodiment of the invention however, step d) comprises providing a crude or only partially purified/clarified lemon juice composition, comprising a citrate component. Crude or partially purified/clarified lemon juice may confer favorable organoleptic profiles, which contribute positively to the taste and flavour characteristics of food products to which they are added. Moreover, such products will provide additional benefits with regard to labeling and regulatory aspects. In one embodiment, a lemon juice concentrate containing at least 30% w/w) of a citric acid component, preferably citric acid and/or a citric acid salt, is provided in step d), more preferably at least 35% (w/w), most preferably at least 40% (w/w). In an embodiment a solid composition comprising lemon juice solids is provided in step d). Lemon juice concentrate and solid compositions containing lemon juice solids are commercially available. Preferably at least partially neutralized lemon juice concentrate or solid compositions comprising lemon juice solids are provided, characterized by a pH value within the range of 4-9, more preferably within the range of 5-8, most preferably within the range of 6.-7.6

In another preferred embodiment of the invention, step d) comprises providing a crude or partially purified/clarified ferment, referred to herein as 'fermentation product', comprising a lactate component and/or propionate component. Such crude or partially purified/clarified ferments have very favorable organoleptic profiles, which contribute positively to the taste and flavour characteristics of food products to which they are added. Moreover, such fermentation products will provide additional benefits with regard to labeling and regulatory aspects.

As used herein the term 'fermentation product' refers to a composition that is obtainable by fermentation of a fermentable substrate with a suitable microorganism, in this case a lactic acid and/or propionic acid producing microorganism, resulting in a composition typically comprising, besides the lactic acid or propionic acid component, traces of the fermentable substrate, other substances produced by the microorganism, and traces of the microorganism itself, e.g. cellular debris and/or cellular components. The lactic acid and/or propionic acid producing micro-organisms may also produce other preservative compounds such as nisin or other bacteriocins, acetic acid, succinic acid, etc. As such, a liquid fermentation product is distinguishable from e.g. highly purified products. The term however does not exclude products which have been subjected to some form of purification/clarification and/or concentration.

In one embodiment, the fermentation product is the supernatant obtainable by fermentation of a fermentable substrate with a lactic acid or propionic acid producing microorganism followed by separating supernatant from (wet) biomass and other solid particles.

In one embodiment of the invention, the fermentation product is a concentrated supernatant obtainable by fermentation of a fermentable substrate with a lactic acid or propionic acid producing microorganism followed by separating supernatant from (wet) biomass and other solid particles and concentrating the supernatant.

In one embodiment of the invention the fermentation product is a partially purified and optionally concentrated supernatant obtainable by fermentation of a fermentable substrate with a lactic acid or propionic acid producing microorganism followed by separation of supernatant from (wet) biomass and other solid particles, purification of the supernatant and, optionally, concentration of the supernatant, with the proviso that the purification does not result in a level of the lactate component or propionate component of more than 97 wt % on a dry solids weight basis, preferably it does not result in a level of the lactate component or propionate component of more than 96 wt % on a dry solids weight basis, most preferably it does not result in a level of the lactate component of more than 95 wt % on a dry solids weight basis.

As will be clear to those skilled in the art, the fermentation product comprises other dispersed or dissolved solids besides the lactate or propionate component. Typical examples of such other dispersed or dissolved solids include sugars, such as lactose, glucose and sucrose; other organic acids and/or salts thereof, such as citric acid, pyruvic acid, malic acid, succinic acid, formic acid and acetic acid; nitrogen containing substances, such as amino acids, peptides and proteins; nucleic acid components such as DNA and RNA fragments, nucleotides and nucleosides; cell membrane phospholipids; vitamins; trace elements; and pigments. In a preferred embodiment of the invention the liquid fermentation product comprises at least one, at least two, at least three, at least four or at least five components selected from the group consisting of lactose, glucose, sucrose, citric acid and salts thereof, pyruvic acid and salts thereof, malic acid and salts thereof, succinic acid and salts thereof, formic acid and salts thereof, acetic acid and salts thereof, amino acids, peptides and proteins.

The liquid fermentation product, in accordance with a preferred embodiment has a pH value, when diluted with water to a 10% (w/w) solids level, within the range of 4-9, more preferably within the range of 5-8, most preferably within the range of 6-7.6

In a particularly preferred embodiment of the invention, a process as defined herein is provided, wherein step d) comprises:

d1) providing a nutrient medium comprising a solution of a fermentable substrate and a nitrogen source in an aqueous medium;

d2) inoculating said nutrient medium with a lactic acid or propionic acid producing microorganism;

d3) incubating the inoculated nutrient medium under conditions favorable to the growth and/or metabolic activity of said lactic acid or propionic acid producing microorganism, for a period sufficient to produce a first fermentation broth containing a lactate component and/or a propionate component;

d4) removing wet biomass from said first fermentation broth to obtain a supernatant; and, optionally, d5) subjecting said supernatant to further purification, with the proviso that the purification does not result in a level of the lactate and/or propionate component of more than 95 wt %, on a dry solids basis.

In a particularly preferred embodiment of the invention, step d1) comprises providing a nutrient medium comprising a carbon source selected from sugars such as glucose, sucrose, fructose, galactose and lactose and/or starch (hydrolysates) and step d2) comprises inoculating said nutrient medium with lactic acid producing bacteria, preferably lactic acid bacteria belonging to the order *Lactobacillales* or moderately thermophilic *Bacillus* species, such as *Lactobacillus casei, Lactobacillus acidophilus, Lactobacillus delbrueckii, Lactobacillus paracasei, Lactobacillus helveticus, Lactococcus lactis, Lactococcus plantarum, Bacillus coagulans, Bacillus smithii* and/or *Bacillus thermoamylovorans*.

In another particularly preferred embodiment of the invention, step d1) comprises providing a nutrient medium comprising a carbon source selected from glucose, lactose or lactate and step d2) comprises inoculating said nutrient medium with propionic acid producing bacteria, in particular bacteria from the genus *propionibacterium*, such as *Propionibacterium freudenreichii, Propionibacterium shermanii, Propionibacterium acidipropionici, Propionibacterium thoenii* and/or *Propionibacterium jensenii*.

As stated above, in a preferred process a step d4) is performed comprising removing wet biomass and other solid particles from the fermentation broth to obtain a supernatant, which can be used as the liquid fermentation product according to the invention.

The process may optionally comprise a step d5) comprising subjecting the supernatant to further purification, with the proviso that the purification does not result in a level of the lactate or propionate component of more than 97 wt % on a dry solids basis, preferably it does not result in a level of the lactate or propionate component of more than 96 wt % on a dry solids weight basis, most preferably it does not result in a level of the lactate or propionate component of more than 96 wt % on a dry solids weight basis. In a preferred embodiment of the present invention, a process as defined herein before is provided, wherein the supernatant as separated from the wet biomass in step d4) is not subjected to a processing step wherein dissolved or non-dissolved solid matter is removed.

In an embodiment of the invention, step d) comprises the additional step d6) of concentrating the ferment obtained in step d4) or d5), to a concentrate comprising a dry solids level of up to 80 wt %, preferably 45-75 wt %, more preferably 50-70 wt %, most preferably 55-65 wt %.

As will be appreciated by those skilled in the art, it is a particular advantage of the present invention that blends of vinegar and other food ingredients can be produced having high concentrations of acetate/acetic acid. Hence, in one embodiment of the invention, a process as defined herein before is provided, wherein the food preservation product obtained after step e) has a final total concentration of acetate and acetic acid of above 10% (w/w), preferably above 20% (w/w), more preferably above 25%, even more preferably above 30%.

Furthermore, in one embodiment of the invention, a process as defined herein before is provided, wherein the food preservation product obtained after step e) has a pH value, when diluted with water to a 10% (w/w) dry solids level, within the range of 5-9, more preferably within the range of 5.5-8, most preferably within the range of 6-7.

An aspect of the invention concerns the liquid compositions obtainable by the processes as defined herein.

Hence, in an aspect of the invention, a concentrated neutralized vinegar is provided with a total dry matter content of at least 50% (w/w), e.g. at least 50.1% (w/w); at least 50.5% (w/w); at least 51% (w/w); or at least 52% (w/w). In a particularly preferred embodiment of the invention the concentrated neutralized vinegar has a total dry matter content of at least 55% (w/w), even more preferably at least 60% (w/w), and comprising potassium cations in an amount of at least 50 (mol) % of the total amount of cations present, more preferably at least 60 (mol) %, more preferably at least 70 (mol) %, more preferably at least 80 (mol) %, most preferably at least 90 (mol) %.

Also provided is a concentrated neutralized vinegar with a total acidity based on acetic acid of at least 500 mmol per 100 ml., more preferably at least 550 mmol per 100 ml, most re preferably at least 600 mmol per 100 ml, and comprising potassium cations in an amount of at least 50 (mol) % of the total amount of cations present, more preferably at least 60 (mol) %, more preferably at least 70 (mol) %, more preferably at least 80 (mol) %, most preferably at least 90 (mol) %.

Also provided is a concentrated neutralized vinegar with a total acidity based on acetic acid of at least 31% (w/w), preferably at least 34% (w/w), more preferably at least 37% (w/w), and comprising potassium cations in an amount of at least 50 (mol) % of the total amount of cations present, more preferably at least 60 (mol) %, more preferably at least 70 (mol) %, more preferably at least 80 (mol) %, most preferably at least 90 (mol) %.

Also provided is a concentrated neutralized vinegar comprising at least 50% (w/w) of potassium actetate, preferably at least 55% (w/w), more preferably at least 60% (w/w).

The above described concentrated neutralized vinegars preferably have a degree of neutralization of at least 50%, more preferably at least 60%, more preferably at least 70%, more preferably at least 80%, more preferably at least 90%, more preferably at least 95% and most preferably at least 99%

The above described concentrated neutralized vinegars preferably have a pH value within the range of 5-9 more preferably 5.5-8.0, most preferably 5.8-7.5.

An aspect of the invention concerns a liquid food preservation product which is essentially a mixture of a concentrated neutralized vinegar as described herein before and a standard non-neutralized vinegar.

Hence, a liquid food preservation product is provided, comprising vinegar and/or neutralized vinegar, having a total acidity based on acetic acid of at least 25% (w/w), preferably at least 27.5% (w/w), more preferably at least 30% (w/w) and a free acidity based on acetic acid within the range of 3.5-10% (w/w), preferably within the range of 4.0-6.0% (w/w), most preferably within the range of 4.2-5.5% (w/w) and comprising potassium cations in an amount of at least 50 (mol) % of the total amount of cations present in the liquid food preservation product more preferably at least 60 (mol) %, more preferably at least 70 (mol) %, more preferably at least 80 (mol) %, most preferably at least 90 (mol) %.

The above described liquid food preservation products preferably have a pH value within the range of 5-9 more preferably 5.5-8, most preferably 5.8-7.5.

The above described food preservation products preferably have a degree of neutralization of at least 50%, more preferably at least 60%, more preferably at least 70%, more preferably at least 80%, most preferably at least 90%.

An aspect of the invention concerns a liquid food preservation product which is a mixture of a concentrated neutralized vinegar and a composition comprising a lactate component, a proprionate component and/or a citrate component as described herein before.

Hence, a liquid food preservation product is provided having a total acidity of at least 32% (w/w), preferably at least 33% (w/w), more preferably at least 35% (w/w), even more preferably at least 37% (w/w) and having a total acidity based on acetic acid of at least 5% (w/w), preferably at least 6%, preferably at least 7%, more preferably at least 8%, more preferably at least 9%, even more preferably at least 10%, even more preferably at least 11% (w/w).

The above described liquid food preservation products preferably comprise one or more components selected from lactate, propionate and citrate. In a preferred embodiment of the invention, the (w/w) ratio of acetic acid to other organic acids is at least 16%, more preferably at least 19%, most preferably at least 22%, most preferably 25%.

The above described liquid food preservation products preferably have a pH value within the range of 5-9 more preferably 5.5-8, most preferably 5.8-7.5.

The above described concentrated neutralized vinegars preferably have a degree of neutralization of at least 50%, more preferably at least 60%, most preferably at least 70%, e.g. within the range of 50-98%, within the range of 60-95%, or within the range of 65-90%.

In the above described liquid food preservation products preferably at least 50 (mol) % of the total amount of cations present in the liquid food preservation product are potassium cations, more preferably at least 60 (mol) %, more preferably at least 70 (mol) %, more preferably at least 80 (mol) %, most preferably at least 90 (mol) %. Food preservation products as defined here above can also be provided in dry form, typically by subjecting the liquid product to standard drying processes, such as spray drying. Products accordingly obtained are typically characterized by the presence of high (relative) amounts of acetate as well as by the presence of high (relative) amounts of potassium cations.

Hence, a food preservative product in solid form is provided, comprising partially or completely neutralized acetic acid, wherein potassium cations are present in an amount of at least 50 (mol) % of the total amount of cations present, more preferably at least 60 (mol) %, more preferably at least 70 (mol) %, more preferably at least 80 (mol) %, most preferably at least 90 (mol) %.

The above described food preservative product in solid form preferably comprises one or more components selected from partially or completely neutralized lactate, partially or completely neutralized propionate and partially or completely neutralized citrate. In a preferred embodiment of the invention, the (w/w) ratio of acetate to other organic acids is at least 16%, more preferably at least 19%, most preferably at least 22%, most preferably 25%. The above described food preservative product in solid form preferably has a pH value, when dissolved in water at a 10% dry solids weight level, within the range of 5-9 more preferably 5.5-8, most preferably 5.8-7.5.

The above described food preservative product in solid form preferably has a degree of neutralization of at least 50%, more preferably at least 60%, more preferably at least 70%, more preferably at least 80%, most preferably at least 90%.

Other aspects of the present invention entail the treatment of a food product by incorporating therein the concentrated neutralized vinegar and/or liquid food preservation products as described herein and/or by applying the concentrated neutralized vinegar and/or liquid food preservation product to the surface of the food product. The treatment of food processing equipment by applying to the surface thereof the concentrated neutralized vinegar and/or liquid food preservation products as described herein is also envisaged.

In a preferred embodiment of the invention, said food product is selected from the group consisting of ready meals, soups, sauces, fresh meat, fresh poultry, fresh fish or seafood, fresh produce, cut produce, composite foods, dairy products, snacks, processed meat or poultry products, cooked meat or poultry products, salad dishes, pasta dishes, pizza's, lunch meals.

Typically, the method entails the incorporation of the concentrated neutralized vinegar and/or liquid food preservation products as described herein in an amount sufficient to accomplish an improvement in the product, preferably in relation to one or more of the following:
i) extended shelf-life of the food product
ii) reduced outgrowth, germination, sporulation and/or toxin formation of/by pathogenic microorganisms, especially *Clostridium botulinum, Clostridium perfringens, Staphylococcus aureus, Listeria monocytogenes* and/or *Bacillus cereus* in the food product;
iii) enhanced protection of a food product against spoilage by pathogenic and non-pathogenic microorganisms, such as yeasts, moulds, fungi and/or bacteria;
iv) reduced risk with a food product of foodborne diseases, foodborne illness and/or food poisoning.

As commonly understood by those skilled in the art, these effects constitute relative improvements, not absolute characteristics. Hence, the amount may be any amount that confers a noticeable effect in terms of one or more of the above criteria, as compared to a food product not comprising the present preservative system (but otherwise identical).

In one preferred embodiment, the use entails the incorporation of the preservative composition of this invention in the food product in an amount resulting in an acetate level, in the form of acetic acid and/or salts thereof, of more than 10 ppm, preferably more than 100 ppm, preferably more than 250 ppm, preferably more than 500 ppm, preferably more than 1000 ppm, preferably more than 2000 ppm, preferably more than 3000 ppm, preferably more than 4000 ppm, preferably more than 5000 ppm, preferably more than 6000 ppm, most preferably more than 7000 ppm.

Also provided herein is the food product obtainable by the treatment described herein before.

Also provided herein, is the use of a composition as defined herein, for the preservation of a food product selected from the group consisting of ready meals, soups, sauces, fresh meat, fresh poultry, fresh fish or seafood, fresh produce, cut produce, composite foods, dairy products, snacks, processed meat or poultry products, cooked meat or poultry products, salad dishes, pasta dishes, pizza's, lunch meals.

In a preferred embodiment of the invention, said use, as will be understood by those skilled in the art, has one or more of the following purposes/objectives/effects recited here above.

Also provided herein, is the use of a composition as defined herein, for imparting or enhancing organoleptic attributes in the food product.

In a preferred embodiment of the invention, a use as defined herein is provided, wherein said organoleptic attribute is selected from the group of saltiness, brothiness, acidity.

Thus, the invention has been described by reference to certain embodiments discussed above. It will be recognized that these embodiments are susceptible to various modifications and alternative forms well known to those of skill in the art.

Many modifications in addition to those described above may be made to the structures and techniques described herein without departing from the spirit and scope of the invention. Accordingly, although specific embodiments have been described, these are examples only and are not limiting upon the scope of the invention.

Furthermore, for a proper understanding of this document and in its claims, it is to be understood that the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

All patent and literature references cited in the present specification are hereby incorporated by reference in their entirety.

The following examples are offered for illustrative purposes only, and are not intended to limit the scope of the present invention in any way.

EXAMPLES

Example 1: Preparation of a Neutralized Vinegar Concentrate

Vinegar 300 grain (Fleischmann), direct pH 2.2 is neutralized with a 50% KOH-solution to a pH of 8.5. The neutralized vinegar (dry matter content=31%) is evaporated in a falling film evaporator up to a dry matter content of 62% The composition of the neutralized vinegar concentrate is given in the table below. The stability of the concentrate was monitored by visual inspection on precipitation during storage at ambient temperature. The concentrate proved to fulfill the stability requirements for common industrial applications.

Example 2: Preparation of Concentrated Vinegar

A concentrated vinegar was prepared by adding 300 grain vinegar (Fleischmann), water and optionally 50% NaOH to the product as obtained in example 1 The composition of the concentrated vinegar as compared to a commercially available product is given in the table below.

Concentrated Vinegar Based on Neutralized Vinegar Concentrate

|  | Cane vinegar (IsoAge) | Concentrated vinegar 1 | Concentrated vinegar 2 | Concentrated vinegar 3 |
|---|---|---|---|---|
| Recipe |  |  |  |  |
| Neutralized vinegar concentrate (62% potassium acetate) [% w/w] |  | 25.7 | 42.6 | 73.7 |
| Vinegar 300 grain [%] |  | 52.8 | 39.2 | 12.1 |
| NaOH 50% [%] |  | 15.6 | 10.4 |  |
| Water [%] |  | 5.9 | 7.8 | 14.2 |
| Total |  |  |  |  |
| Composition |  |  |  |  |
| Acetic acid [%] | 24.8 | 25 | 27.5 | 31.5 |
| Na [%] | 4.6 | 4.5 | 3.0 |  |
| K [%] | 6.3 | 6.3 | 10.5 | 18.2 |
| Dry matter [%] | 35.5 | 36 | 41 | 49 |
| pH direct | 6.4 | 6.3 | 6.6 | 7.2 |
| Free acidity (as acetic acid) [g/100 ml] | 3 | 4 | 4 | 4 |

The products were found to be stable at ambient temperature; no precipitation and/or crystallization occurred within a period of at least one month. The products were tested on application in various food products. It was established that the products of the invention had equal performance, both in terms of preservative effect and impact on the organoleptic properties, as the commercially available product. The products of the invention however have the advantage of lower dosage levels and improved microbiological stability of the preservative product. Food products prepared with this product can have a clean label that mentions the presence of eg "natural vinegar".

Example 3: Preparation of Preservative Products with Mixed Organic Acids

Neutralized vinegar concentrate prepared as according to example 1 was mixed with lactic acid and propionic acid ferments in order to prepare products with a relatively high amount of vinegar. The recipes for and the composition of the products is given in the table below.

Products Based on Neutralized Vinegar Concentrate and Lactic Acid Ferments

|  | Product 1 | Product 2 | Product 3 |
|---|---|---|---|
| Recipe |  |  |  |
| Lactic acid ferment 1 (49.2% lactic acid) [%] | 47.84 |  |  |
| Lactic acid ferment 2 (96% lactic acid) [%] |  | 32.0 | 27.44 |
| Neutralized vinegar concentrate (62% potassium acetate) [%] | 22.83 | 30.0 | 40.00 |
| KOH 50% [%] | 29.33 | 38.0 | 32.56 |
| Total | 100 | 100 | 100 |
| Composition |  |  |  |
| Lactic acid [%] | 23.5 | 30.7 | 26.3 |
| Acetic acid [%] | 8.7 | 11.4 | 15.2 |
| Ratio lactic acid/acetic acid | 2.71 | 2.69 | 1.73 |
| Potassium [%] | 15.8 | 20.6 | 21.2 |
| Dry matter [%] | 48 | 62.6 | 62.5 |

Products based on neutralized vinegar concentrate and propionic acid ferments. The propionic acid ferments 1-4 differ with respect to the propionic acid and lactic acid content due to variations in the downstream processing process of these ferments. Processes to produce these types of ferments are well known in the art. The method described in patent publication no. EP2224011, for example, is particularly suitable in this regard.

|  | Product 4 | Product 5 | Product 6 | Product 7 | Product 8 |
|---|---|---|---|---|---|
| Recipe |  |  |  |  |  |
| Propionic acid ferment 1) [%] | 83.26 |  |  |  |  |
| Propionic acid ferment 2) [%] |  | 79.77 |  | 70.0 |  |
| Propionic acid ferment 3) [%] |  |  | 70.0 |  |  |
| Propionic ferment 4) [%] |  |  |  |  | 70.0 |
| Neutralized vinegar concentrate (62% potassium acetate) [%] | 16.74 | 20.23 | 30.0 | 30.0 | 30.0 |
| KOH 50% [%] |  |  |  |  |  |
| Total | 100 | 100 | 100 | 100 | 100 |
| Composition |  |  |  |  |  |
| Propionic acid [%] | 3.9 | 4.8 | 2.7 | 4.2 | 4.8 |
| Acetic acid [%] | 7.8 | 9.4 | 12.4 | 12.9 | 13.2 |
| Lactic acid [%] | 26.8 | 32.4 | 31.9 | 28.4 | 27.0 |
| Sodium [%] | 2.06 | 2.49 | 1.41 | 2.18 | 2.49 |
| Potassium [%] | 15.5 | 8.8 | 21.1 | 19.5 | 18.9 |
| Dry matter [%] | 57.4 | 69.2 | 70.1 | 68.3 | 67.7 |

The products of the invention have the advantage of lower dosage levels and improved microbiological stability of the preservative product. Food products prepared with these preservative products can have a clean label that mentions the presence of eg "natural vinegar" and/or "cultured corn sugar".

The invention claimed is:

1. A liquid food preservation product, comprising vinegar and/or neutralized vinegar, having a total acidity based on acetic acid in excess of 25% (w/w) and a free acidity based on acetic acid of within the range of 3.5-10%, and comprising potassium cations in an amount of at least 50 (mol) % of the total amount of cations present in the liquid food preservation product, wherein the liquid food preservation product is obtained by a process comprising:
   (a) providing a first liquid vinegar;
   (b) adding an alkaline potassium compound to the liquid vinegar to produce a neutralized vinegar having a pH between 7.5 and 9, wherein at least 50% of the total mol amount of the cations added is potassium;
   (c) concentrating the neutralized vinegar to a dry solids level of 50-70% (w/w) by evaporation to produce a liquid concentrated neutralized vinegar;
   (d) providing a second liquid vinegar; and
   (e) combining the liquid concentrated neutralized vinegar with the second liquid vinegar to produce the liquid preservation product.

2. The food preservation product according to claim 1, having a total acidity based on acetic acid of at least 30% (w/w).

3. The food preservation product according to claim 1, having a free acidity based on acetic acid within the range of 4.0-6.0% (w/w).

4. The food preservation product according to claim 1, comprising potassium cations in an amount of at least 80 (mol) % of the total amount of cations present in the liquid food preservation product.

5. The food preservation product according to claim 1, having a degree of neutralization of at least 50%.

6. The food preservation product according to claim 5, having a degree of neutralization of at least 80%.

7. The food preservation product according to claim 1, having a pH value within the range of 5-9.

8. The food preservation product according to claim 7, having a pH value within the range of 5.5-8.

9. A food preservation product, having a pH between 5 and 9, comprising (i) at least 5% vinegar and/or neutralized vinegar, and (ii) a lactate, propionate, and/or citrate component, the liquid food preservation product having a total acidity of at least 32% (w/w), wherein the liquid food preservation product is obtained by a process comprising:
   (a) providing a first liquid vinegar;
   (b) adding an alkaline potassium compound to the liquid vinegar to produce a neutralized vinegar having a pH between 7.5 and 9, wherein at least 50% of the total mol amount of the cations added is potassium;
   (c) concentrating the neutralized vinegar to a dry solids level of 50-70% (w/w) evaporation to produce a liquid concentrated neutralized vinegar; and
   (d) combining the liquid concentrated neutralized vinegar with:
      (i) a fermentation product that is obtained by fermentation of a fermentable substrate with a lactic acid producing microorganism followed by separating supernatant from biomass and other solid particles and concentrating the supernatant, and/or
      (ii) a fermentation product that is obtained by fermentation of a fermentable substrate with a propionic acid producing microorganism followed by separating supernatant from biomass and other solid particles and concentrating the supernatant, and/or
      (iii) lemon juice concentrate containing at least 30% (w/w) of citric acid and/or a citric acid salt.

10. The food preservation product according to claim 9, having a total acidity a total acidity based on acetic acid of at least 5% (w/w).

11. The food preservation product according to claim 10, having a total acidity a total acidity based on acetic acid of at least 8% (w/w).

12. The food preservation product according to claim 9, wherein the (w/w) ratio of acetic acid to other organic acids is at least 16%.

13. The food preservation product according to claim 9, having a degree of neutralization of at least 50%.

14. The food preservation product according to claim 13, having a degree of neutralization of 60-95%.

15. The food preservation product according to claim 9, wherein at least 50 (mol) % of the total amount of cations present are potassium cations.

16. The food preservation product according to claim 15, wherein at least 80 (mol) % of the total amount of cations present are potassium cations.

17. The food preservation product according to claim 1, having a pH value within the range of 5-9.

18. The food preservation product according to claim 17, having a pH value within the range of 5.5-8.

* * * * *